No. 797,198. PATENTED AUG. 15, 1905.
R. M. GRIFFITH
AUTOMATIC ELECTRIC CUT-OFF.
APPLICATION FILED JAN. 16, 1905.
3 SHEETS—SHEET 1.
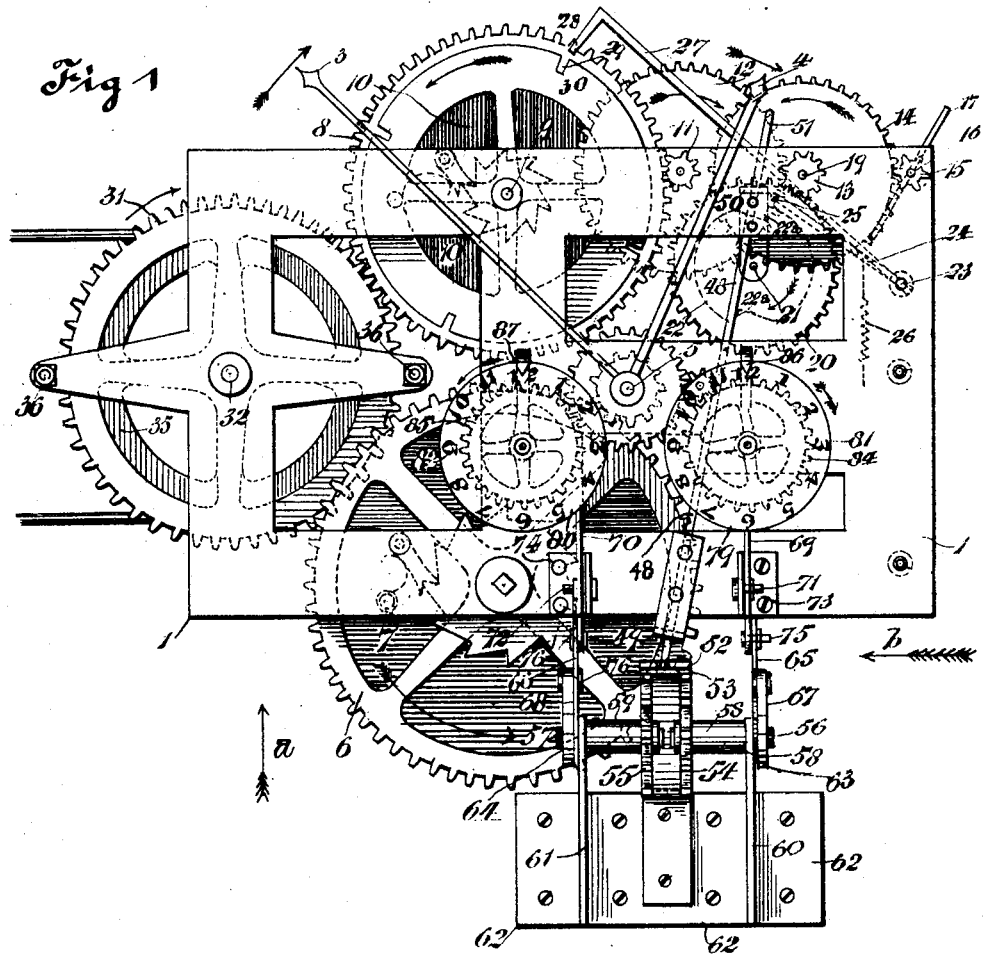
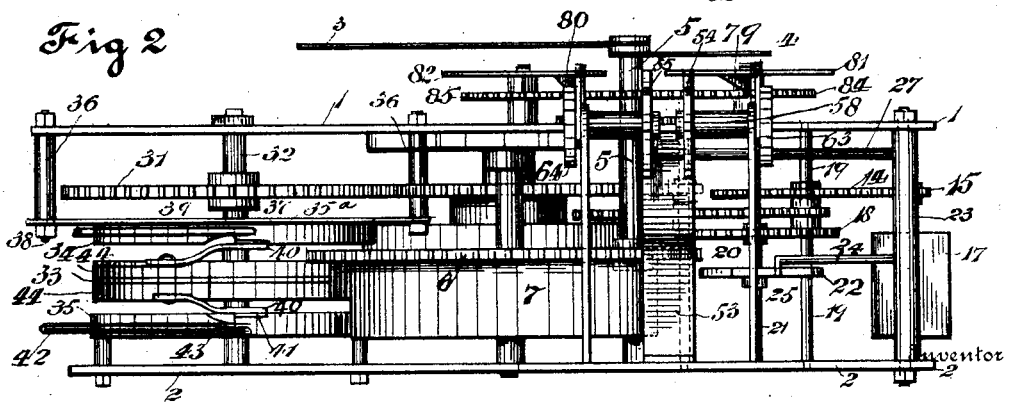
Witnesses
Wm O. Morck
Florence Gimbel
Inventor
Roy M Griffith
By Thompson Bell
Attorney No. 797,198. PATENTED AUG. 15, 1905.
R. M. GRIFFITH.
AUTOMATIC ELECTRIC CUT-OFF.
APPLICATION FILED JAN. 16, 1905.
3 SHEETS—SHEET 2.
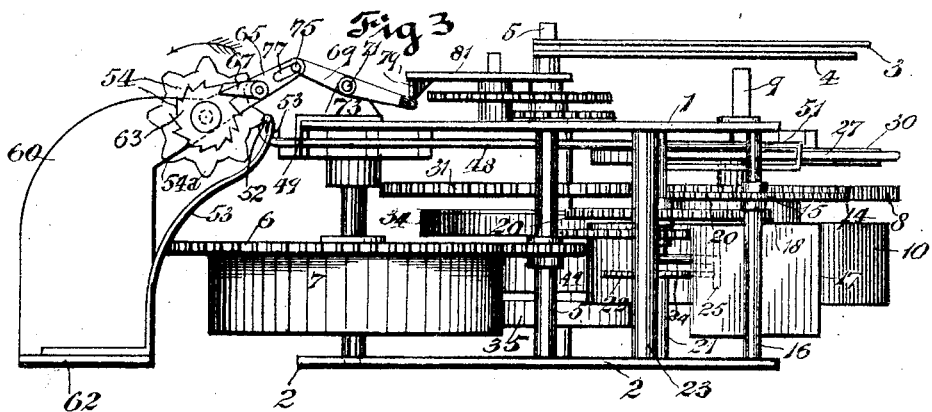
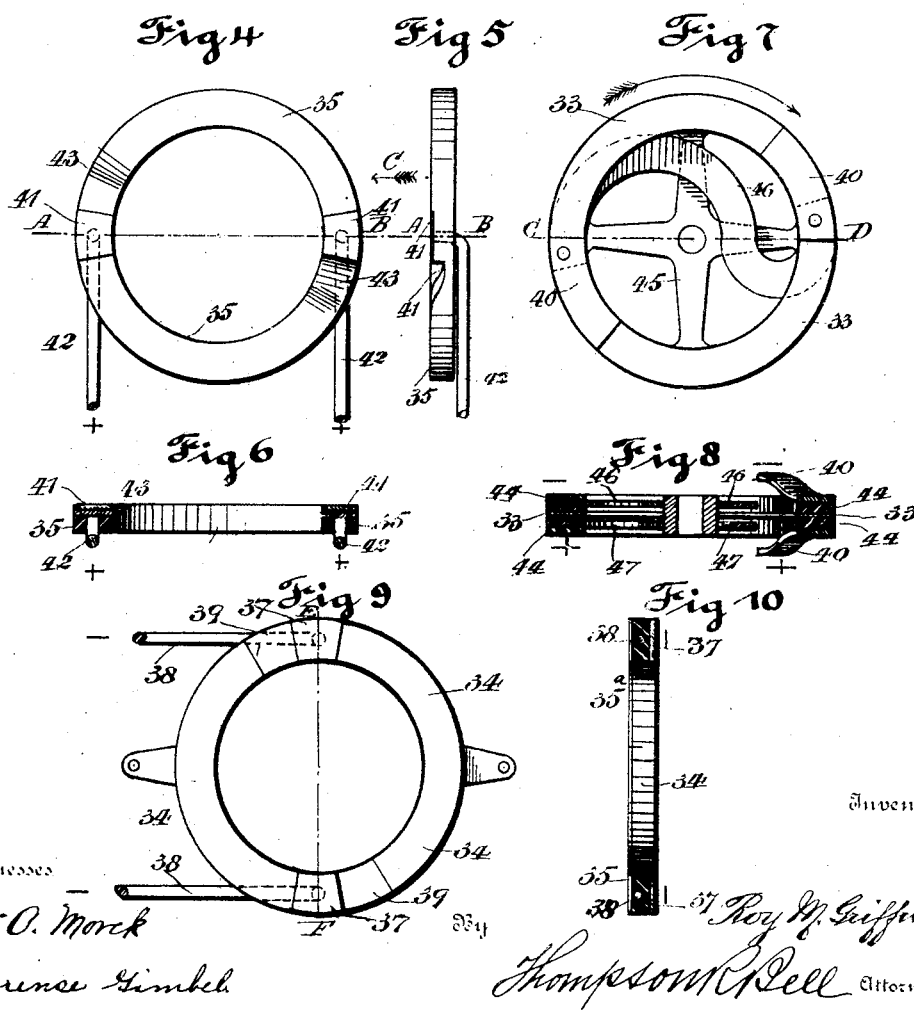
Witnesses
Wm O. Morck
Florence Gimbel
Inventor
Roy M. Griffith
Thompson K Bell Attorney No. 797,198. PATENTED AUG. 15, 1905.
R. M. GRIFFITH.
AUTOMATIC ELECTRIC CUT-OFF.
APPLICATION FILED JAN. 16, 1905.
3 SHEETS—SHEET 3.
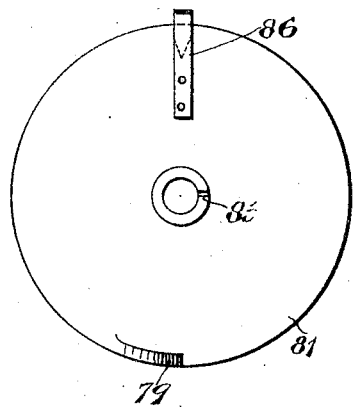
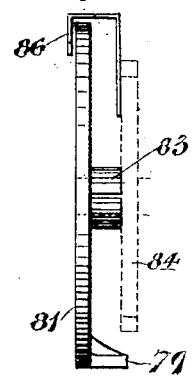
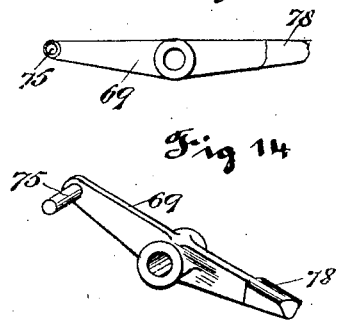
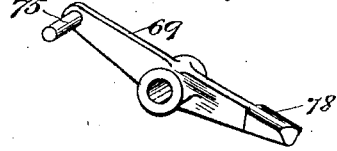
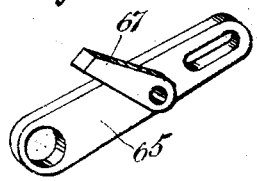
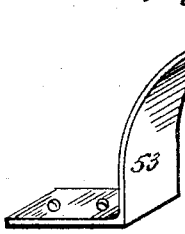
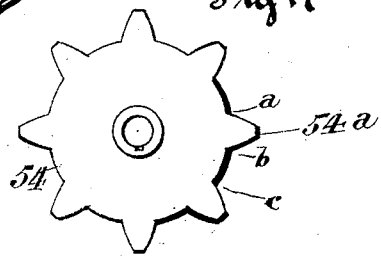
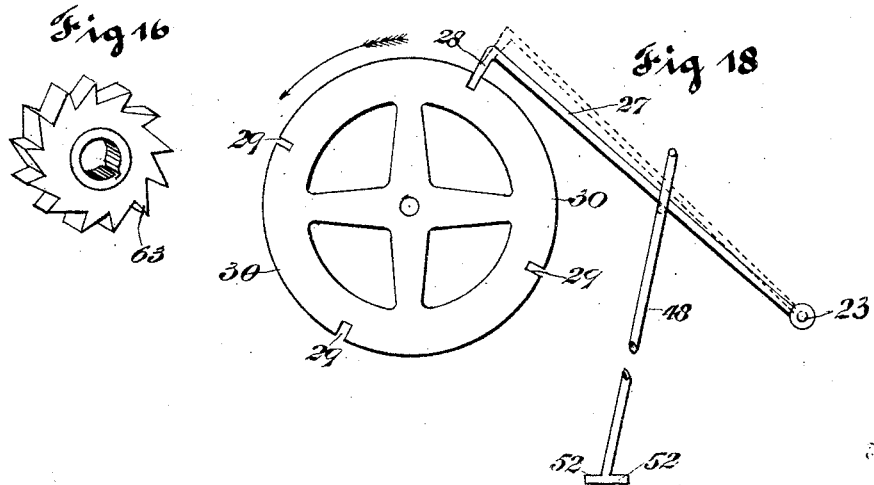
Witnesses
Wm O. Morck
Florence Gimbel
Inventor
Roy M. Griffith
By Thompson & Bell
Attorney

UNITED STATES PATENT OFFICE.

ROY M. GRIFFITH, OF ELWOOD, INDIANA.

AUTOMATIC ELECTRIC CUT-OFF.

No. 797,198.  Specification of Letters Patent.  Patented Aug. 15, 1905.

Application filed January 16, 1905. Serial No. 241,341.

*To all whom it may concern:*

Be it known that I, ROY M. GRIFFITH, a citizen of the United States, residing at Elwood, county of Madison, and State of Indiana, have invented certain new and useful Improvements in Automatic Electric Cut-Offs, of which the following is a specification, reference being had therein to the accompanying drawings.

This invention relates to a means connected to electric conducting-wires, whereby the current or currents are cut off at certain fixed or predetermined times and whereby the current or currents are turned on or off at certain other predetermined times, as hereinafter more fully described, and particularly pointed out in the claims.

The object of this invention is to provide a means to be attached to a clock or to be embodied in the construction of a time-clock whereby at certain periods of the day and night electric currents for supplying power or light will be turned off or the current be broken during one portion or that portion of the day when not required and the current turned on and the circuit opened when required during the remaining or any other portion of the day when required, also to provide an adjustable or setting means whereby the current may be cut off by breaking or closing the circuit and turned on by opening or connecting the circuit and to construct such means that the circuit may be opened or closed at any predetermined time or times. I attain these objects by means of the mechanism illustrated in the accompanying drawings, in which similar numerals of reference designate like parts throughout the several views.

Figure 1 is a plan view of a clock mechanism with the dial thereof removed, showing my time cut-off mechanism applied thereto. Fig. 2 is an elevational view of the same looking in the direction of the arrow *a*. Fig. 3 is an elevational view of the same looking in the direction of the arrow *b*. Fig. 4 is a plan view of the lower fixed ring of the cut-out switch. Fig. 5 is a side view of the same looking in the direction of the arrow *c*. Fig. 6 is a sectional side view of the same, taken through the line A B. (See Fig. 4.) Fig. 7 is a plan view of the revolving switch-ring. Fig. 8 is a sectional view of the same, taken through the line C D. (See Fig. 7.) Fig. 9 is an inverted plan view of the upper fixed ring of the switch. Fig. 10 is a sectional view of the same, taken through the line E F. (See Fig. 9.) Fig. 11 is an inverted plan view of one of the time-setting dials. Fig. 12 is a side view of the same. Fig. 13 is a plan view of the cam-lever. Fig. 14 is a perspective view of the same. Fig. 15 is a perspective view of the pawl-carrying lever. Fig. 16 is a perspective view of the ratchet-wheel. Fig. 17 is a side elevational view of the throw-out cam-disk. Fig. 18 is a diagram view of the switch-regulating mechanism, and Fig. 19 is a detail perspective view of the throw-out retaining-spring.

The framework whereby the clock mechanism is carried comprises an upper plate-frame 1 and a lower plate-frame 2, in which the ends of the spindles of the various gears of the clockwork are journaled.

The minute-hand 3 and the hour-hand 4, which are mounted in the usual manner on the spindle 5, are driven at their relative velocities by suitable gearing (by the usual gear mechanism, not shown) peculiar to all clocks, which spindle is connected to the main drive-wheel 6, connected to the spring-drum 7, in which latter is inclosed a spiral spring for driving the clock mechanism.

A wheel 8 is mounted on the spindle 9, on which is also mounted a spring-drum 10, similar to the spring-drum 7, in which drum a coil-spring is inclosed and arranged to rotate or drive the gear-wheel 8. The velocity of the gear-wheel 8 is controlled by means of a fan-governor 17, which is driven by the train of gears 11 12 13 14, meshing with the gear 15 on the governor-spindle 16, on which spindle said fan-governor 17 is secured to turn therewith.

The gear-pinion 18, secured on the spindle 19 and situated beneath the pinion 13, meshes with the gear-wheel 20, secured on the spindle 21 to rotate the latter. On the spindle 21 is secured the retaining-disk 22, on diametrically opposite sides of the periphery of which are formed the notches 22ª, which are provided for the purpose hereinafter set forth.

A spindle 23 is pivoted in the top and bottom plate-frames at one side of the retaining-disk 22, and projecting from the said spindle 23 is the arm 24 and the bent end 25 of which is held in contact with the periphery of the retaining-disk 22 by a suitable coil-spring 26. Extending from the said spindle 23 is the arm 27, the bent locking end 28 of which is adapted to engage the notches 29, formed in the stop-disk 30, which disk is connected to the spring-drum 10 to be rotated in the direction indicated by the arrow and to rotate with the drive-gear 8 and in the same direction.

The diametrically-opposing notches of the retaining-disk 22 are provided for the purpose of permitting the bent end 25 of the releasing-arm 24 to be released simultaneously with the approach of the locking end 28 of the arm 27 toward a locking-notch 29, formed in the disk 30, to permit said locking bent end or catch 28 to engage one of the notches 29 to prevent a further rotation of the driving-gear 8 and to hold the same and all the mechanism connected thereto stationary till said catch 28 is again released.

The gear-wheel 8 meshes with the gear-wheel 31 to turn the spindle 32, on which latter is securely mounted the revolving switch-ring 33, which latter is situated on said spindle 32 between the fixed top switch-ring 34 and the fixed bottom switch-ring 35. The top switch-ring 34 is constructed of hard rubber, fiber, or other suitable insulating material formed in a continuous ring and is of a diameter equal to the switch-ring 33 (see Figs. 9 and 10) and is secured to the supporting metallic ring or plate $35^a$, which latter is suspended from the top frame 1 by the depending posts 36. Switch contacting or conducting plates 37 are situated on diametrically opposite sides of the center of and secured to the face of the insulating-ring 34, and connected to said contacting or conducting plates 37 are the negative conducting-wires 38. Recesses 39 are formed in the insulating-ring 34 and are provided for the purpose of permitting the switch-contacting spring-plates 40 of the revolving switch-ring 33 to be quickly released from their contacting or conducting plates. When the said switch-ring 33 is revolved, to remove the contacting spring-plates 40 from the contacting plates 37 said spring-plates 40 when they reach the edges of the contacting plates adjacent the opposing recesses are simultaneously and quickly released to quickly break the contact between the spring contacting plates 40 and the contacting plates 37 and 41.

The lower fixed switch-ring 35, which is of the same diameter and is similarly constructed as the upper switch-ring 34, is provided with the face-contacting plates 41, to which are connected the positive conducting-wires 42. Similarly-constructed gaps 42 are formed in said switch-ring 35 adjacent to the contacting or conducting plates 41 and are provided for the same purpose as the recesses 39 of the switch-ring 37, and the said upper switch-ring 34 and the lower switch-ring 35 are so situated relatively to each other that the contacting plates 41, together with their adjacent recesses 43, fall directly beneath the contacting plates 37 and the recesses 39, respectively, of the upper switch-ring 34, and thus when the spring contacting plates 40 are simultaneously brought into contact with the contacting plates 37 and 41 the circuit is immediately made.

The revolving switch-ring 33, situated between the upper and the lower fixed switch-rings 34 and 35, is secured on the spindle 32 to turn therewith, and said revoluble switch-ring 33 is provided with upper and lower rings 44, composed of a non-conducting material, such as vulcanite, fiber, or the like, secured on the top and bottom sides of the switch-ring 33, and said switch-ring 33 and the rings 44 are concentric with the upper and lower fixed switch-rings 34 and 35.

The upper and lower spring contacting plates 40 are situated on diametrically opposite sides of the axis of said revoluble switch-rings 44 on the directly opposite faces thereof, so that the opposing spring-plates 40 will be directly above the lower spring-plate and they being thus situated will simultaneously contact the contacting plates 37 and 41 to close or make the connection and also be simultaneously released to break contact with said plates to break or open the circuit.

An upper insulated negative connecting-bar 46 and a lower insulated positive connecting-bar 47 connect the upper negative and the lower positive contacting spring-plates, situated on diametrically opposite sides of the revolving switch-ring, situated and secured on the opposing upper and lower faces of said revolving switch.

A throw-out rod 48 is adapted to slide in suitable bearings 49 and 50, and said throw-out rod is provided at one end with a loop or eye 51, which encircles the arm 27 intermediate the bend 28 and the pivotal axis of the latter, and on the opposite end of said throw-out rod exterior of the bearing 49 is formed the T-head 52, which head is adapted to engage both the throw-out and multiple cams 54 and 55. The throw-out spring 53 is adapted to engage the T-head 52 of the throw-out rod 48 to retain the latter in contact with the multiple-cam disks 54 and 55, which are situated side by side or nearly touching and on the same axial center line and are secured on the shafts 56 and 57, respectively, which latter are operated to turn, together with their respective cam-disks, independently of each other. The shafts 56 and 57 are journaled in suitable bearings 58 and 59, formed integral on the uprights 60 and 61, formed on the base 62. On the outer ends of the shafts 56 and 57 exterior of the uprights 60 and 61 are secured the ratchet-wheels 63 and 64. Pawl-carrying levers 65 and 66 are pivoted on the shafts 56 and 57 intermediate the uprights 60 and 61 and the ratchet-wheels 63 and 64, and carried by said pawl-carrying levers 65 and 66 are the pawls 67 and 68, which pawls are adapted to be independently operated to engage the ratchet-wheels 63 and 64 to turn the cam-disks a portion of a revolution to cause, first, one of the series of cams to quickly engage and then release the T-head 52 to move the throw-out rod 48 to disengage the bend 28 with the disk 30 to permit the latter to make one-fourth of a turn, and thereby rotate the switch-ring 33 one-fourth of a revolution to break the circuit. The cam-levers 69 and 70 are pivoted intermediate their ends on the pins 71 and 72, carried by the supporting-standards 73 and 74. On one of the ends of each of the cam-levers 69 and 70 are secured the pins 75 and 76, which pins engage the slots 77, formed in said pawl-carrying levers to operate said pawl-carrying levers when the cams 69 and 70 are depressed at their cam-operated ends 78. The cam-operated ends 78 of said cam-operated levers 69 and 70 are constructed, as shown in Fig. 14, with a rounded contacting top portion, which is preferably so constructed to permit the said cams to freely slide upon and the more readily contact with the least sliding resistance between the surfaces of the cams 79 and 80 of the setting-disks 81 and 82 and the said ends 78 of the cam-operated levers.

The cam-disks 81 and 82, each of which are constructed alike, are provided with a longitudinally-split hub 83, which hub is bored and adapted to tightly fit on either the hubs of the gear-wheels 84 and 85 to turn therewith, but not so tight as to prevent said disks from being moved by hand to set them.

Indicator-pointers 86 and 87 are secured on the gears 84 and 85 to turn therewith, and said pointers are bent over the faces of their disks, so that their pointed ends are contiguous to the number on the face of the disk at which the latter is set.

The operation of the above-described is as follows: One of the setting disks or dials, as the disk 81, is first set to a certain predetermined time, so that its cam 79 at a certain point of the revolution of the hour gear-wheel 84 will operate the lever 69 at said time to cause a partial rotation of the cam-disk 54, through its pawl-and-ratchet mechanism, to cause one of the cams 54ª, formed on its periphery, to operate the spring 53 to move the throw-out rod 48 to cause the arm 27 to disengage its locking or bent end 28 with one of the notches 29 of the disk 30 to release the same to permit the drive gear-wheel 8, which meshes with the wheel 30, secured on the spindle 32 of the revoluble switch-ring 33, to make a portion of a revolution, thereby causing the switch-ring 33 to make one-fourth of a revolution, which movement of the switch-ring causes the contacting plates 40 to be moved into contact with the surfaces of the switch-rings 37 and 38, thereby breaking the contact between said conducting-plates 37 and 41 and said contacting plates 40 to shut off the flow of current. The movement imparted to the multiple-disk cam 54 causes the latter to revolve from "a" to "b," and when said dial 81 has completed its next revolution to cause its cam 79 to again contact the lever 69 to again cause a partial rotation of the multiple-cam disk 54—that is, a rotation from "b" to "c" equivalent to the arc situated between two cams. This arc being concentric with the center of its disk does not disturb the spring 53. Thus the throw-rod does not move to disengage the bend 28 of the arm 27 to disengage one of the notches 29 of the disk 30 to release the latter to permit a movement of the revoluble switch-ring 33, and thus the switch-ring 33 is caused to be operated by the single disk 81 only one time during twenty-four hours, and in order that a second motion be imparted a second and independent setting-disk 82 and throw-out mechanism similar to the disk 81 and its throw-out mechanism must be provided, as previously described. The setting-disk 82 is next set to a predetermined time, so that its cam will operate to move the lever 70 to operate the cam-disk 55 through its connecting mechanism to cause a movement of the throw-out rod 48 to again release the disk 30 to permit another quarter-revolution of the switch-ring 33 to cause its spring contacting plates 40 to again contact with the contacting plates 37 and 41 to open the circuit, and thus the electric circuit is alternately made and broken at certain predetermined or fixed times during the day or night.

Having thus fully described this my invention, what I claim as new and useful, and desire to cover by Letters Patent of the United States therefor, is—

1. In an automatic electric-current cut-off, the combination with an electric switch, comprising upper and lower fixed switch-rings of an insulating or other non-conducting material having a common center, and a revoluble ring situated intermediate said upper and lower rings and having its axis concentric with the centers of said upper and lower switch-rings, contacting plates secured on the faces of each of said upper and lower rings at diametrically opposing sides of the centers of the same, upper and lower spring contacting plates secured to the insulated faces of said revoluble switch-ring and situated on diametrical opposite sides of the axis of the latter and arranged to simultaneously contact the contacting plates of said upper and lower fixed switch-rings, connecting-bars connecting the diametrical opposite positive and negative spring contacting plates situated on opposite faces of said revoluble switch-ring, and means for operating said revoluble switch-ring, of a time-clock mechanism, means connected to said clock mechanism whereby the switch-operated mechanism is periodically released to operate said revoluble switch to make or break the electric circuit.

2. In an automatic electric-current cut-off, the combination with an electric switch, the clock mechanism for operating said switch and means for retaining said switch clock mechanism at rest, of a throw-out rod, as described, a cam-disk having a series of peripheral cams, a revoluble time-setting dial connected to said time-clock mechanism, and means situated between said time-setting dial for intermittingly operating said cam-disk.

3. In an automatic electric-current cut-off, the combination with an electric switch, a clock mechanism for driving said electric switch comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk, and yielding means for retaining the bent end of said swinging arm in engagement with the notches of said disk, a revoluble cam-disk, a throw-out rod extending between said swinging arm and cam-disk, a time-setting disk connected to be driven by said time-clock mechanism and means connecting said time-disk and said disk cam to intermittingly rotate said disk cam.

4. In an automatic electric-current cut-off, the combination with an electric switch, an independent clock mechanism for driving said electric switch, comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk and means for yieldingly retaining the bent end of said swinging arm in engagement with the notches of said disk, of a revoluble cam-disk, a throw-out rod extending between said swinging arm and said cam-disk, a time-setting disk driven by said clock mechanism, a time-setting disk and a time-setting disk cam, means connecting said time-disk and said cam-disk to intermittingly rotate the latter, comprising a lever mechanism, a pawl, a ratchet-wheel and a cam-disk shaft, and means for supporting said cam-disk shaft.

5. In an automatic electric-current cut-off, the combination with an electric switch, a clock mechanism for driving said electric switch comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk, and yielding means for retaining the bent end of said swinging arm in engagement with the notches of said disk, of a revoluble cam-disk, a throw-out rod extending between said swinging arm and cam-disk having one end looped around said swinging arm, and a T-head formed on its opposite or cam-contacting end, a time-setting disk connected to be driven by said time-clock mechanism, means connecting said time-disk and said cam-disk to intermittingly rotate said cam-disk, comprising a lever mechanism, a pawl, a ratchet-wheel and a cam-disk shaft, and means for supporting said cam-disk shaft.

6. In an automatic electric-current cut-off, the combination with an electric switch, a clock mechanism for driving said electric switch comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk, and yielding means for retaining the bent end of said swinging arm in engagement with the notches of said disk, of a revoluble cam-disk, a throw-out rod extending between said swinging arm and cam-disk having one end looped around said swinging arm, and a T-head formed on its opposite or cam-contacting end, and means for yieldingly retaining said T-head in contact with said cams, a time-setting disk connected to be driven by said time-clock mechanism, means connecting said time-disk and said cam-disk to intermittingly rotate said cam-disk, comprising a lever mechanism a pawl, a ratchet-wheel and a cam-disk shaft, and means for supporting said cam-disk shaft.

7. In an automatic electric-current cut-off, the combination with an electric switch, a clock mechanism for driving said electric switch comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk, and yielding means for retaining the bent end of said swinging arm in engagement with the notches of said disk, of a revoluble cam-disk, a throw-out rod extending between said swinging arm and cam-disk having one end looped around said swinging arm, and a T-head formed on its opposite or cam-contacting end, a vertically-extending plate-spring having its free end situated back of said T-head and adapted to yieldingly retain the latter in contact with said cam-disk, a time-setting disk connected to be driven by said time-clock mechanism, means connecting said time-disk and said cam-disk to intermittingly rotate said cam-disk, comprising a lever mechanism, a pawl, a ratchet-wheel, and a cam-disk shaft, and means for supporting said cam-disk shaft.

8. In an automatic electric-current cut-off, the combination with an electric switch, a clock mechanism for driving said electric switch comprising a main drive-wheel, a governing-fan and a series of intermediate gears connecting said governing-fan and said main drive-wheel, a notched disk concentric with said main drive-wheel and arranged to turn therewith, a swinging arm having a bent end adapted to engage the notches of said notched disk, and yielding means for retaining the bent end of said swinging arm in engagement with the notches of said disk, of a pair of revoluble cam-disks situated side by side, a throw-out rod extending between said swinging arm and cam-disk having one end looped around said swinging arm, and a T-head formed on its opposite or cam-contacting end, a vertically-extending plate-spring having its free end situated back of said T-head and adapted to yieldingly retain said T-head in contact with said cam-disks, a pair of time-setting disks connected to be driven independently of each other by said time-clock mechanism, means connecting said time-disks and said cam-disks to intermittingly rotate said cam-disks, comprising a lever mechanism, a pawl, a ratchet-wheel and a cam-disk shaft, and means for supporting said cam-disk shaft.

In testimony whereof I affix my signature in presence of two witnesses.

ROY M. GRIFFITH.

Witnesses:
THOMPSON R. BELL,
FLORENCE GIMBEL.